Figure 1:
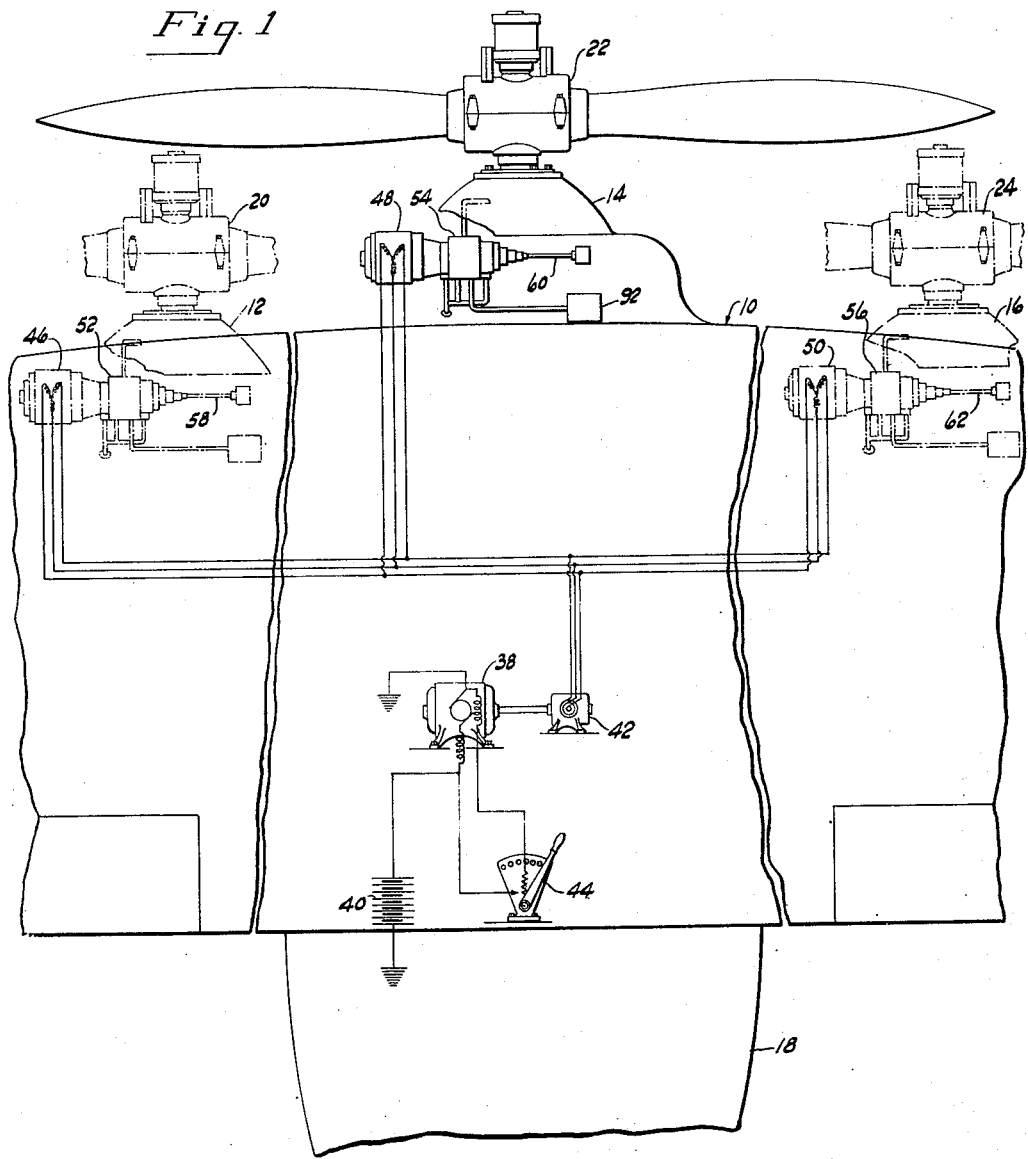

Sept. 21, 1943.   E. MARTIN ET AL   2,330,070
MOTOR SYNCHRONIZER
Filed June 5, 1937   3 Sheets-Sheet 2
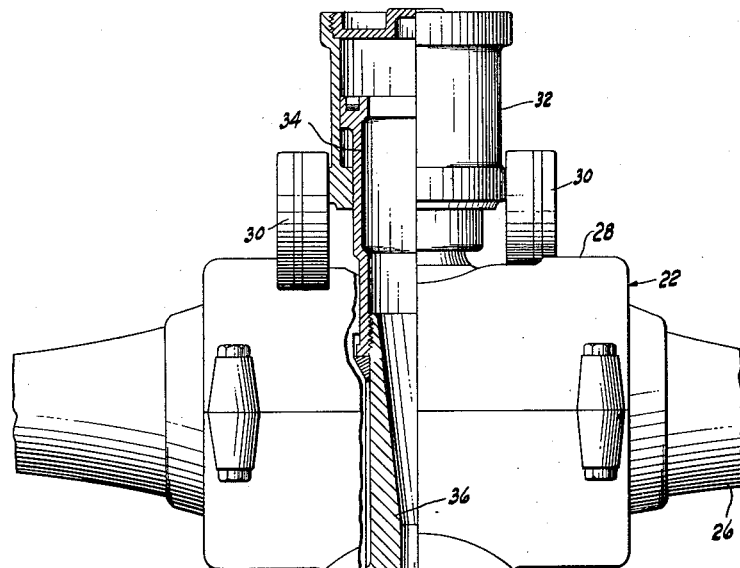
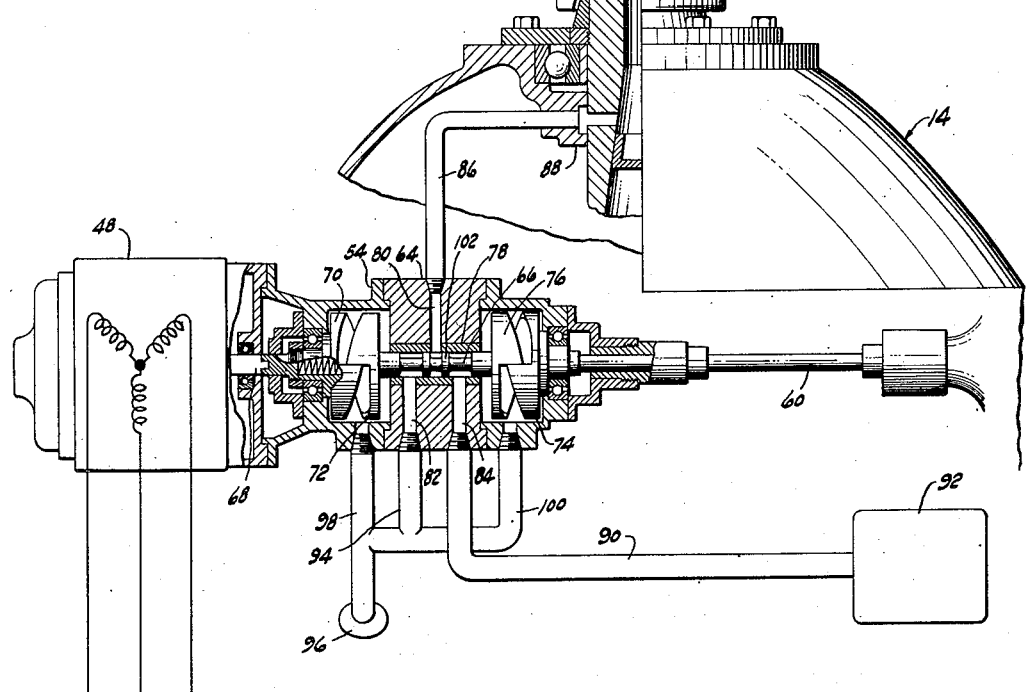
Fig. 2
INVENTOR:
Erle Martin
BY Frank W. Caldwell
Harris G. Luther ATTORNEY Patented Sept. 21, 1943

2,330,070

UNITED STATES PATENT OFFICE 2,330,070

MOTOR SYNCHRONIZER

Erle Martin, West Hartford, and Frank W. Caldwell, Hartford, Conn., assignors to United Aircraft Corporation, East Hartford, Conn., a corporation of Delaware Application June 5, 1937, Serial No. 146,664

8 Claims. (Cl. 170—135.6)

This invention relates to improvements in the controlling and synchronizing devices and has particular reference to an improved device for controlling and synchronizing the speeds of the engines of a multi-engined vehicle such as a multi-engined airplane.

An object of the invention resides in the provision of electrically actuated speed control and synchronizing means for controlling the engine speed by adjusting the pitch of controllable pitch propellers driven by the engine.

A further object of the invention resides in the provision of a speed controlling and synchronizing device of the character specified which is effective to maintain the speed of the various engines within relatively close limits of synchronization and which at the same time is relatively free from hunting and other defects.

A still further object resides in the provision of an improved speed control and synchronizing device of the character specified by means of which the speed of the engines may be varied at will and the engines will be maintained in synchronism at any selected speed.

An additional object resides in the provision of an improved speed controlling and synchronizing device of the character specified which may wholly replace the speed controlling mechanism ordinarily employed on constant speed vehicle engines and will function to maintain the speed of each engine substantially constant at a selected rate and at the same time will function to maintain the speeds of all of the engines in synchronization.

Other objects and advantages will be more particularly pointed out hereinafter or will become apparent as the description proceeds.

In the accompanying drawings in which like reference numerals are used to designate similar parts throughout, there is illustrated a suitable mechanical embodiment of what is now considered to be the preferred form of the idea of the invention and one somewhat modified form thereof. The drawings, however, are for the purpose of illustration only and are not to be taken as limiting the invention, the scope of which is to be measured entirely by the scope of the appended claims.

In the drawings

Fig. 1 is a somewhat schematic plan view of a fragmentary portion of a multi-motored airplane showing a speed controlling and synchronizing arrangement constructed according to the idea of this invention applied thereto.

Figure 3:
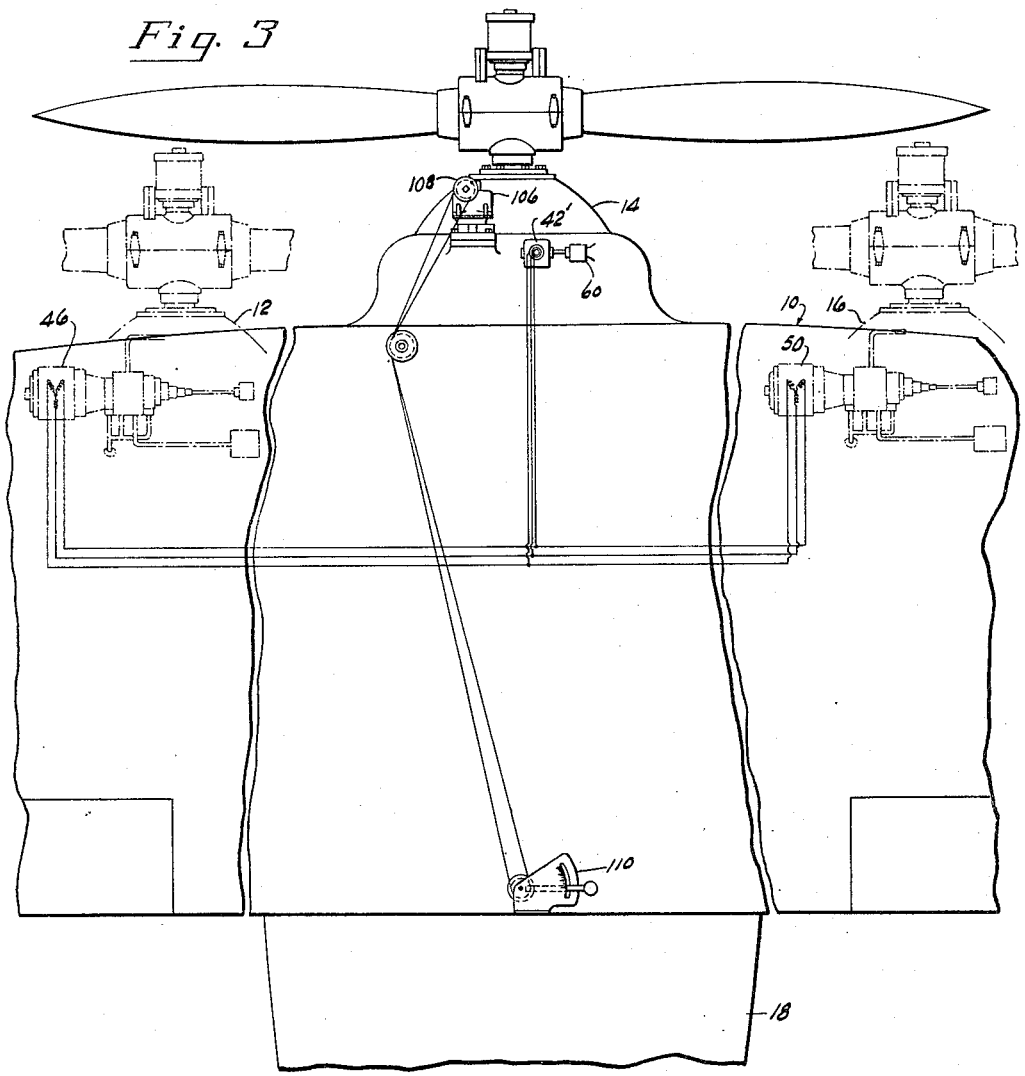

Fig. 2 is a view on an enlarged scale of a fragmentary portion of an aircraft engine and controllable pitch propeller and an engine speed controlling device constructed according to the idea of the invention, certain portions of the engine, the propeller and the speed controlling device being broken away and shown in sections to better illustrate the construction thereof, and, Fig. 3 is somewhat schematic plan view of a fragmentary portion of a multi-motored airplane showing a modified form of speed controlling and synchronizing mechanism constructed according to the idea of the invention applied thereto.

Referring to the drawings in detail the numeral 10 generally indicates the wing of an airplane upon which are supported engines indicated at 12, 14 and 16. While the drawings illustrate an airplane having three engines supported upon a wing, it is to be understood that the invention is in no way limited to the number of engines or the manner in which they are supported upon the airplane with the exception that there must be at least two engines in order that the device of the invention may function as a synchronizer.

The airplane, in addition to the wing 10, may comprise a hull or fuselage portion 18 and the various other conventional portions which are well-known to the art and which it is not considered necessary to illustrate or describe for the purposes of this disclosure. It is also obvious that the idea of the invention may be applied to multi-engined vehicles other than airplanes, such for instance as boats and locomotives.

In the application of the invention illustrated, each of engines 12, 14 and 16 drives a respective aeronautical propeller as indicated at 20, 22 and 24.

Each of the propellers comprises a plurality of blades 26 rotatably secured at their base ends in a retaining barrel member 28 and operatively connected to respective centrifugally actuated counter weights 30 which are, in turn, operatively connected to a cylinder 32, reciprocally mounted on a piston 34, secured upon the outer end of the engine or propeller shaft 36. The blades are also supported upon and driven by a hub member, not illustrated, splined upon the projecting end of the shaft 36. The counter weights 30 are operative to urge the blades 26 towards their high-pitched position and suitable means are provided for supplying hydraulic fluid under pressure through the hollow power shaft 36 to the space between the outer end of the piston 34 and the closed outer end of the cylinder 32 to move the cylinder outwardly with respect to the piston to thereby overcome the action of the counter weights and move the blades towards their low pitched position. For a more complete description of a suitable controllable pitch aeronautical propeller reference may be had to Patent No. 2,032,255 issued February 25, 1936, to Frank W. Caldwell, for Propeller, but it is to be understood that the device of the invention may be applied to various other forms of controllable pitch propellers without in any way exceeding the scope of the invention.

In the form of the invention illustrated in Fig. 1 a controllable constant speed motor 38 is energized by some suitable source of power, such as the battery 40, and is arranged to drive an alternating current generator or alternator 42. The speed of the motor may be adjusted by suitable means, such as the manually controllable rheostat 44, in order that the motor 38 may be made to operate at any selected speed within the range of the manual control. The speed of the motor will, of course, tend to remain constant at any selected rate until the rate is manually changed.

The alternator 42 is electrically connected in parallel with a synchronous electric motor device, one for each engine, as indicated at 46, 48 and 50. Each of the synchronous motor devices 46, 48 and 50 is drivingly connected to a speed controlling device as indicated at 52, 54 and 56, respectively. The opposite side of each of the speed controlling devices is drivingly connected to the respective motor 12, 14 or 16 by a suitable driving connection as indicated at 58, 60 and 62, respectively. Each of the speed controlling devices 52, 54 and 56 is essentially a differential mechanism which is influenced by a difference in the speed of the engine to which it applies, and the speed of the respective synchronous motor, 46, 48 or 50, to apply a corrective force to the respective propeller 20, 22 or 24 to maintain the engine in synchronism with the speed of the motor 38.

One of the synchronizing devices, for instance, that of the central engine 14, is particularly illustrated in Fig. 2. As the synchronizing devices for all of the engines are similar in all respects, it is believed that a detailed description of only one of the synchronized devices is sufficient for the purpose of this disclosure.

From an inspection of Fig. 2 it will be observed that the speed controlling device 54 comprises a valve casing 64 containing an axially slidable valve member 66 disposed in a substantially centrally located aperture in said casing and arranged between the synchronous motor 48 and the engine drive 60. The shaft 68 of the synchronous motor is drivingly connected to a cam 70 which cooperates with a cam 72 carried upon the adjacent end of the valve stem member 66. The end of the motor drive 60 carries a similar cam 74 which cooperates with a cam 76 carried upon the adjacent end of the valve member 66. The pairs of cooperating cams 70—72, and 74—76 are provided with complementary sloped surfaces on their annular peripheries so arranged that a displacement of one of the cams of either pair with respect to the other cam of the same pair will cause an axial movement of the valve member 66.

The valve member 66 is preferably surrounded by a sleeve or bushing 78 of some suitable bearing material disposed in the aperture in the valve casing 64 and the valve casing is provided with radially directed channels 80, 82 and 84 leading from the exterior of the valve casing to the interior of the bushing 78.

The channel 80 is centrally disposed with respect to the length of the casing 64 and is hydraulically connected by means of a suitable conduit 86 and slip ring 88 to the interior of the hollow power shaft 36 to provide a channel for the flow of hydraulic fluid to and from the hydraulic propeller actuating cylinder 32. The channel 84 is disposed on the engine drive side of the center of the valve casing 64 and is connected by a conduit 90 with a suitable source of fluid under pressure such as the lubricating oil pressure pump, schematically indicated at 92.

The channel 82 is disposed on the motor side of the center of the valve casing and is suitably connected by a conduit 94 with a drain 96. Additional drains 98 and 100 are provided to drain seepage oil from the interior of the valve casing 64 and the chambers provided for the cams.

The valve member 66 is provided with enlarged end portions which have a substantially sealing fit with the interior of the bushing 78, and with an enlarged central valve portion 102, which in the neutral position of the valve member 66, covers the end of the channel 80. In the form of the invention illustrated in Fig. 2 the intermediate valve portion 102 takes the form of a pair of spaced shoulders on the central portion of the valve member 66, have a sealing fit with the interior of the bushing 78, and are spaced apart a distance substantially equal to the width of the channel 80. For a more detailed description of a suitable speed controlling means reference may be had to Patent No. 2,026,814 issued January 7, 1936, to Frank W. Caldwell and Erle Martin, for Propeller controlled mechanism.

The operation of the mechanism so far described is substantially as follows. When the engine and the respective synchronous motor are both rotating at the same speed, the valve member 66 occupies a central position, such as is illustrated in Fig. 2, being preferably moved to and maintained in such central position by suitable resilient means, such as the coiled compression springs, one of which is indicated at 104. If the speed of the engine tends to exceed the speed of the motor, the engine drives the cam member 72 through the cam pair 74—76 and rotationally displaces the cam member 72 with respect to the complementary cam 70. By reason of the sloped peripheral cam surfaces this displacement will force the valve member 66 to the right, as viewed in Fig. 2, and connect the channel 80 with the channel 82, thereby permitting hydraulic fluid to drain from the hydraulic propeller actuating mechanism. As the hydraulic fluid drains from the cylinder 32, the counter weights move the propeller blades 26 to a position of higher pitch, thereby imposing an additional load on the engine and reducing its speed. As soon as the engine speed has been reduced to equality with that of the motor, the spring 104 returns the valve member 66 to its neutral position in which position it blocks the channel 80 and maintains the propeller in the position of adjustment in which the engine speed is synchronized with the speed of the motor.

If, on the other hand, the speed of the engine tends to fall below the speed of the motor, the motor drives the cam 76 through the cam pair 70—72 and causes a displacement of cam 76 with respect to the complementary cam 74, thereby forcing the valve member 66 to the left, as viewed in Fig. 2. This movement of the valve member connects the channel 80 with the channel 84, thereby applying hydraulic fluid under pressure to the hydraulic propeller pitch control mechanism to reduce the pitch of the propeller blades to thereby reduce the load on the engine and permit the engine speed to come up to a condition of equality with the speed of the motor. When the engine and motor speeds are synchronized, the valve member 66 is returned to its neutral position by the resilient centering means and the propeller is maintained in its adjusted condition as long as synchronism continues.

From the above description it will be apparent that the speed controlling devices are effective to maintain the respective engines 12, 14 and 16 in synchronism with the respective synchronous motors 46, 48, and 50. As all of the motors 46, 48 and 50 are driven in parallel from the same alternator 42, all of the motors will tend to operate at exactly the same speed and consequently since the engine speeds are adjusted to the speeds of the respective synchronous motors, the speeds of all of the engines will be maintained in synchronism. Since the constant speed motor 38 tends to maintain the same constant speed for any selected setting, the speeds of all engines will also be maintained at a constant value and will be varied only by operation of the manual control 44. From the above description it will be observed that there has been provided a simple and effective synchronizing arrangement which is also effective as a constant speed control for the respective engines of a multi-engined vehicle.

While a particular form of speed controlling device has been illustrated and described for the sake of convenience, it is to be understood that the invention is not limited to the particular form so illustrated and described but that various other speed controlling devices could be employed between the synchronous motors and the respective engine drives.

In the modified form of the invention illustrated in Fig. 3 the constant speed master motor has been eliminated and one of the engines, for instance, the central engine 14, has been arranged to function as the master motor. In this form of the invention the speed of the master engine 14 is controlled by a suitable speed responsive device such as the governor 106 constructed and operated in a manner well known to the art. The governor 106 has a speed control mechanism 108 suitably connected with a manual control device 110 so that the speed of the master engine 14 can be selected by the operator and so that the speed will be maintained constant at the selected rate. The master engine drive 60, instead of being connected with a speed controlling mechanism, is drivingly connected with an alternator 42, which is electrically connected in parallel with the synchronous motors 46 and 50 of the respective engines 12 and 16. In this form of the invention the alternator 42' drives the synchronous motors 46 and 50 at the same speed at which it is itself driven by the engine 14, thus each engine is provided with a constant speed device all of which operate at the same speed and under the control of these synchronizing devices the speeds of the engines 12 and 16 are maintained in synchronism with the speed of the master engine 14 in the manner described above.

Since the cams 70, 72, 74 and 76 are effective to move the valve 66 upon a difference in speed of less than one revolution, it will be observed that the device is extremely sensitive and effective to maintain the various engines in substantially exact synchronization. Also, since the armatures of the synchronous motors are relatively heavy, their rotational inertia will prevent the synchronizing mechanism from chattering or hunting, this advantage being particularly described in Patent No. 2,026,814 referred to above.

While there has been illustrated and described a suitable mechanical embodiment of what is now considered to be the preferred form of the idea of the invention and one somewhat modified form thereof, it is to be understood that the invention is not limited to the particular mechanical embodiment so illustrated and described but that such changes in the size, shape and arrangement in parts may be resorted to as come within the scope of the subjoined claims.

Having now described the invention so that others skilled in the art may clearly understand the same, what it is desired to secure by Letters Patent is as follows:

1. Means for synchronizing the speeds of a plurality of engines each driving a controllable pitch propeller comprising, a pitch changing motor for each propeller, an electric motor operative to maintain a substantially constant speed at a selected rate, a generator driven by said motor at a constant speed ratio, a synchronous motor for each engine driven by said generator, a driving connection on each engine, and a control device between each driving connection and the respective synchronous motor and directly connected with the respective pitch changing motor, operative upon a difference in the speeds of the engine and the motor to change the pitch of the respective propeller.

2. Means for synchronizing the speeds of a plurality of aircraft engines driving controllable pitch propellers comprising, a pitch changing motor for each propeller, a power source for each motor, a power unit operable at a controlled speed, a generator driven by said power unit, a synchronous motor for each engine to be synchronized driven by said generator, a driving connection on each of said engines, a respective speed difference responsive control element operatively connected to each synchronous motor and each respective engine driven connection, and means connecting each control element with a power source and directly with a respective pitch changing motor to render said control elements effective to control the pitch of the respective propellers in accordance with the magnitude and direction of the speed difference between said power unit and the respective engines.

3. Means for controlling and synchronizing the speeds of a plurality of aircraft engines driving controllable pitch propellers comprising, a pitch changing motor for each propeller, a power source for said motors, means for controlling the pitch of the propeller driven by one of said engines to maintain the speed of said engine substantially constant at a selected rate and constitute said engine a master engine, a generator driven by said master engine, a synchronous motor for each engine to be synchronized with said master engine driven by said generator, a connection driven by each engine to be synchronized, a respective speed difference responsive control element operatively connected with each synchronous motor and with each respective engine driven connection, and means operatively connecting each control element with a power source and directly with the respective pitch changing motor to render said control elements effective to control the pitch of the respective propellers in accordance with the magnitude and direction of the speed difference between said master engine and the respective controlled engines.

4. Engine control and synchronizing means comprising, a controllable pitch propeller driven by each engine, a hydraulic pitch changing motor for each propeller, a source of hydraulic fluid under pressure, means connecting each pitch changing motor with a source of fluid pressure, a valve in each fluid connection for controlling the respective motor, a power unit operable at a controlled speed, a generator driven by said power unit, a synchronous motor for each engine to be synchronized driven by said generator, a driving connection on each of said engines, and speed difference responsive valve actuating means driven by each synchronous motor and a respective engine driven connection to control the pitch of the respective propellers in accordance with the magnitude and direction of speed differences between said power unit and the respective engines.

5. Means for synchronizing the speeds of a plurality of aircraft engines driving controllable pitch propellers comprising, a pitch changing motor for each propeller, a power source for each motor, a power unit operable at a controlled speed, said power unit comprising a constant speed electric motor, a generator driven by said electric motor, a synchronous motor for each engine to be synchronized driven by said generator, a driving connection on each of said engines, a respective speed difference responsive control element operatively connected to each synchronous motor and each respective engine driven connection, and means connecting each control element with a power source and directly with a respective pitch changing motor to render said control elements effective to control the pitch of the respective propellers in accordance with the magnitude and direction of the speed difference between said electric motor and the respective engines.

6. Means for synchronizing the speeds of a plurality of aircraft engines driving controllable pitch propellers comprising, a pitch changing motor for each propeller, a power source for each motor, a power unit operable at a controlled speed, said power unit comprising a master engine, a generator driven by said master engine, a synchronous motor for each engine to be synchronized driven by said generator, a driving connection on each of said engines, a respective speed difference responsive control element operatively connected to each synchronous motor and each respective engine driven connection, and means connecting each control element with a power source and directly with a respective pitch changing motor to render said control elements effective to control the pitch of the respective propellers in accordance with the magnitude and direction of the speed difference between said master engine and the respective engines.

7. Engine control and synchronizing means comprising, a controllable pitch propeller driven by each engine, a hydraulic pitch changing motor for each propeller, a source of hydraulic fluid under pressure, means connecting each pitch changing motor with a source of fluid pressure, a valve in each fluid connection for controlling the respective motor, a power unit operable at a controlled speed, said power unit comprising an electric motor, a generator driven by said electric motor, a synchronous motor for each engine to be synchronized driven by said generator, a driving connection on each of said engines, and speed difference responsive valve actuating means operatively connected to said valve and driven by each synchronous motor and a respective engine driven connection to control the pitch of the respective propellers in accordance with the magnitude and direction of speed differences between said electric motor and the respective engines.

8. Engine control and synchronizing means comprising, a controllable pitch propeller driven by each engine, a hydraulic pitch changing motor for each propeller, a source of hydraulic fluid under pressure, means connecting each pitch changing motor with a source of fluid pressure, a valve in each fluid connection for controlling the respective motor, a power unit operable at a controlled speed, said power unit comprising a master engine, a generator driven by said master engine, a synchronous motor for each engine to be synchronized driven by said generator, a driving connection on each of said engines, and speed difference responsive valve actuating means operatively connected to said valve and driven by each synchronous motor and a respective engine driven connection to control the pitch of the respective propellers in accordance with the magnitude and direction of speed differences between said master engine and the respective engines.

FRANK W. CALDWELL.
ERLE MARTIN.